US010582535B2

(12) United States Patent
Baldemair et al.

(10) Patent No.: US 10,582,535 B2
(45) Date of Patent: *Mar. 3, 2020

(54) CONTENTION BASED ACCESS CHANNEL SIGNALING

(71) Applicant: Telefonaktiebolaget LM Ericsson (publ), Stockholm (SE)

(72) Inventors: Robert Baldemair, Solna (SE); Jonas Kronander, Knivsta (SE); Zhan Zhang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/117,916

(22) Filed: Aug. 30, 2018

(65) Prior Publication Data
US 2019/0021110 A1 Jan. 17, 2019

Related U.S. Application Data

(63) Continuation of application No. 15/105,618, filed as application No. PCT/SE2013/051568 on Dec. 19, 2013, now Pat. No. 10,149,320.

(51) Int. Cl.
H04W 72/04 (2009.01)
H04W 74/08 (2009.01)
H04W 8/18 (2009.01)
H04W 28/26 (2009.01)
(Continued)

(52) U.S. Cl.
CPC ........... H04W 74/08 (2013.01); H04W 8/186 (2013.01); H04W 28/26 (2013.01); H04W 72/1268 (2013.01); H04W 76/40 (2018.02); H04L 5/0044 (2013.01)

(58) Field of Classification Search
None
See application file for complete search history.

(56) References Cited

U.S. PATENT DOCUMENTS 8,175,015 B1 5/2012 Chowdhuri et al.
2008/0056247 A1 3/2008 Chang et al.
(Continued)

FOREIGN PATENT DOCUMENTS

WO 2009061403 A2 5/2009
WO 2010057540 A1 5/2010
WO 2012148183 A2 11/2012

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 8)", 3GPP TS 36.321 V8.12.0, Mar. 2012, pp. 1-47.
3GPP, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.9.0, Dec. 2009, pp. 1-83.
(Continued)

Primary Examiner — Ayanah S George
(74) Attorney, Agent, or Firm — Murphy, Bilak & Homiller, PLLC

(57) ABSTRACT

The present disclosure concerns radio communication. More particularly, the disclosure presents a contention based access channel signaling between a radio access network node, such as an evolved NodeB (eNB), and a User Equipment (UE). In one example embodiment, the UE receives 110 a data frame comprising multiple zones from an eNB. A zone of the multiple zones comprises an UE group identity as well as an indicator addressing a reserved contention-based access channel for use in another zone by those UEs having said UE group identity. Also, the UE group identity is retrieved 120, or otherwise read, from the zone. If, or when, the UE group identity matches that of the UE, the UE may utilize 130 the addressed reserved contention-based access channel.

12 Claims, 6 Drawing Sheets

(51) Int. Cl.
*H04W 72/12* (2009.01)
*H04W 76/40* (2018.01)
*H04L 5/00* (2006.01)

(56) References Cited

U.S. PATENT DOCUMENTS

2012/0044877 A1* 2/2012 Ratasuk ............. H04W 52/146
370/329
2013/0294360 A1* 11/2013 Yang .................... H04W 24/02
370/329
2013/0308613 A1* 11/2013 Huang ............... H04W 74/008
370/336

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 8)", 3GPP TS 36.331 V8.20.0, Jun. 2013, pp. 1-216.

IEEE, "IEEE P802.11ad™/D5.0 Draft Standard for Information Technology—Telecommunications and Information Exchange Between Systems—Local and Metropolitan Area Networks—Specific Requirements—", IEEE P802.11 ad/D5.0, Sep. 2011 (Draft Amendment based on IEEE P802.11REVmb D10.0) (Amendment to IEEE P802.11 REVmb D10.0 as amended by IEEE 802.11ae D5.0 and IEEE 802.11 aa D6.0, Sep. 2011, pp. 1-601.

Unknown, Author, "Discussion on Operations of Contention-based Transmission", 3GPP TSG-RAN WG2 Meeting #69bis, R2-102208, MediaTek, Beijing, China, Apr. 12-16, 2010, 5 pages.

* cited by examiner

CONTENTION BASED ACCESS CHANNEL SIGNALING

RELATED APPLICATIONS

This application is a continuation of U.S. application Ser. No. 15/105,618 filed Jun. 17, 2016, which is a U.S. National Phase Application of PCT/SE2013/051568 filed Dec. 19, 2013. The entire contents of each aforementioned application is incorporated herein by reference.

TECHNICAL FIELD

Embodiments of the present technology presented herein generally relate to radio communication. More particularly, the present disclosure presents a contention based access channel signaling between a radio access network node, such as an evolved NodeB (eNB), and a User Equipment (UE).

BACKGROUND

This section is intended to provide a background to the various embodiments of the technology that are described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by its inclusion in this section.

Radio communication networks are widely deployed to provide various communication services such as telephony, video, data, messaging, broadcasts, and so on. Such communication networks generally support communications for multiple UEs by sharing available network resources. One example of such a network is the Universal Mobile Telecommunications System (UMTS), a third generation (3G) mobile phone technology standardized by the 3rd Generation Partnership Project (3GPP). UMTS includes a definition for a Radio Access Network (RAN), referred to as Universal Terrestrial Radio Access Network (UTRAN). The UMTS, which is the successor to Global System for Mobile Communications (GSM) technologies, supports various air interface standards, such as Wideband Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with wireless communications. For example, UMTS based on WCDMA has been deployed in many places around the world. To ensure that this system remains competitive in the future, 3GPP began a project to define the long-term evolution of UMTS cellular technology. The specifications related to this effort are formally known as Evolved UMTS Terrestrial Radio Access (EUTRA) and Evolved UMTS Terrestrial Radio Access Network (EUTRAN), but are more commonly referred to by the name Long Term Evolution (LTE).

In LTE, two mechanisms are specified how a UE may request resources from a scheduling evolved NodeB (eNB): i) random access signaling and ii) scheduling request signaling.

Random Access in LTE

Random access (RA) is contention based and is generally used by the UE if it has no resources assigned to it. It should be appreciated that RA is also used by the UE if the UE is not uplink (UL) synchronized and the UE needs to obtain UL synchronization. An eNB generally announces the time-frequency location as well as other important parameters in its system information (SI). This enables a UE to send a message to the eNB using the Random Access Channel (RACH). In LTE the resources allocated for random access are 1 MHz wide and typically 1 ms long. However, in coverage limited situations also longer time slots for longer transmissions maybe reserved. As mentioned above, the parameters describing the RACH are typically signaled via system information. System information distribution in LTE is typically done via RRC (Radio Resource Configuration) signaling and dynamics in the random access channel configurations are relatively slow. Thus, it is generally difficult or as least challenging to change the configuration at immediate, or quick, traffic changes in the radio communication network.

Scheduling Request in LTE

Scheduling requests are dedicated (i.e. not contention based) resources that may be assigned to UEs enabling them to request resources from the eNB. Scheduling request resources are just a single bit and generally do not allow signaling of more information than information representing "I need UL resources". A scheduling request is typically transmitted using one point of a QPSK constellation. If a UE does not request resources, it does not transmit anything. The scheduling request is transmitted on the Physical Uplink Control Channel which spans 180 kHz in LTE. Scheduling request resources are also configured via RRC and changes to its configuration are therefore rather slow. Thus, it is generally difficult or at least challenging to change the configuration at immediate traffic changes in the radio communication network.

Contention Based Access in WiFi 802.11ad

Wi-Fi standard 802.11ad enables scheduled periods and Contention Based Access Periods (CBAP). Contention based access periods are not exclusively assigned to one UE but multiple ones and a UE generally needs to contend to gain access to the shared resource. Contention based access periods are announced in the Beacon Transmission Interval (BTI) which is used to broadcast system information in 802.11ad. The Beacon transmission interval maybe compared to the broadcast channel in LTE and is also a somewhat semi-static channel. Contention based access periods generally span 2 GHz in 802.11ad, i.e. the complete system bandwidth.

Flexible Transmit-Time-Interval (TTI)

With the data rates envisioned in so-called Ultra-Dense Networks (UDN)—in the order of 10 Gbps—it becomes feasible to convey complete Internet Protocol (IP) packets in one scheduling unit without Layer 2 (L2) segmentation. Avoiding L2 segmentation may lead to simpler protocol structures. IP packets generally vary in size and most dominating IP packet sizes are several ten bytes (IP control packets) and 1500 bytes (Maximum Transmission Unit (MTU) size of Ethernet). Fitting an IP packet into one scheduling unit therefore generally requires a Flexible TTI in time which would be shorter for smaller IP packets and longer for larger IP packets.

FIG. 1 illustrates a Flexible TTI fame structure. This figure only shows the time-domain and does not show resource granularity in frequency-domain. However, it should be appreciated that an FDM (Frequency Division Multiplex) component is supported, i.e., within a given portion of the total frame a UE may also be assigned only to a fraction of the complete bandwidth. An example of a frame structure is as follows: A frame is 100 μs long and is subdivided into several sub-frames of e.g. 12.5 μs each. In the frequency-domain the system bandwidth is portioned into sub-channels of e.g. 100 MHz.

Each data frame starts with a first zone 1, where control information is transmitted. Zone 1 is followed by another zone 2, which is the receive part (from the receiving node point of view). Finally, there is yet another zone, i.e. zone 3, which is the transmit part (also from the receiving node point of view). The control signaling comprises information related to which resources within zone 2 the receiving node should decode and on which resources the receiving node may transmit. The control signaling part and/or zone 2 may furthermore comprise acknowledgement bits from a node which received transmissions from this node in an earlier frame. If the control signaling does not utilize all resources of zone 1 it may be considered to assign empty resources of zone 1 to zone 2. Zone 2 generally comprises data transmitted to the node. Depending on the amount of data one, a few or all sub-frames within zone 2 may be assigned to the receiving node. The minimum scheduling unit is 1 sub-frame (time)×1 sub-channel (frequency)=12.5 μs×100 MHz. This unit is also referred to as Atomic Scheduling Unit (ASU). With a rather low spectrum efficiency of 1 bit/s/Hz one ASU may support 1250 bits≈150 bytes. If a node has resources assigned in zone 3 it may use these resources to transmit upon. Also in zone 3 the assigned resources are in multiples of one ASU. In addition to user data transmissions also acknowledgment bits in response to received data (either in this frame or if node processing is too slow in response to data received in an earlier frames) may be transmitted. The split, or division, between zone 2 and zone 3 is flexible. If there are no inter-node interference issues it is generally preferable that the partition between zone 2 and zone 3 is adjustable on a frame basis.

Generally speaking, all signaling schemes described herein (except the zone 2/zone 3 border) above may only be reconfigured on a relatively slow basis, since their respective configuration is of semi-static nature. Thus, this does not necessarily allow for an efficient use of currently unused resources (e.g. UL resources) by the UEs since the contention based channels may only be reconfigured relatively slowly.

Also, a radio access network node is generally aware of the buffer status in the transmission queues that are transmitted from the radio access network node to other UEs or other nodes. However, the radio access network node is typically not aware of the buffer status of remote queues, i.e. the buffer status of UEs and/or other nodes transmitting to the radio access network node. Therefore, the above-mentioned zone 3 may be unused or at least unnecessarily underutilized, in a radio communication network where a radio access network node schedules a UE or another node, this first radio access network node generally has to poll the UEs and/or other nodes scheduled by it so that these nodes may request resources if traffic arrives. This signaling is typically done via scheduling request signaling, buffer status reporting or random access signaling.

SUMMARY

It is in view of the above considerations and others that the various embodiments disclosed herein have been made.

A general object of embodiments presented herein is therefore to provide for an alternative and more efficient utilization of a contention based access channel.

According to an aspect, there is provided a method performed by a User Equipment (UE). The method comprises receiving a first data frame comprising multiple zones from a radio access network node. A first zone of the multiple zones comprises an UE group identity, which is common to several UEs in a group of UEs. Also, the first zone further comprises a first indicator addressing a reserved contention-based access channel for use in a second zone by those UEs having said UE group identity. Moreover, the method comprises retrieving the UE group identity from the first zone and utilizing the addressed reserved contention-based access channel when the UE group identity matches that of the UE.

In one embodiment, the second zone is subsequent to the first zone within the first data frame. In an alternative embodiment, a second data frame comprises the second zone. The second data frame is different from the first data frame.

The first zone may further comprise a second indicator addressing scheduled UL resources for use in the second zone by that UE having an UE identity to which the second indicator is addressed. The method may thus further comprise applying the addressed scheduled UL resources in response to that a retrieved UE identity matches that of the UE. The UE identity may thus be seen as a dedicated UE identity, i.e. an UE identity which is dedicated to one UE and not a group of UEs.

According to another aspect, there is provided a method performed by a radio access network node, such as an eNB. The method comprises forming a first data frame to comprise multiple zones. A first zone of said multiple zones comprises a UE group identity which is common to several UEs in a group of UEs. Also, the first zone further comprises a first indicator addressing a reserved contention-based access channel for use in a second zone by those UEs having said UE group identity. Furthermore, the method comprises signaling (e.g. transmitting or broadcasting) the first data frame to at least one UE, i.e. one or several UEs.

In one embodiment, the second zone is formed to be subsequent to the first zone within the first data frame. In an alternative embodiment, the second zone is incorporated in a second data frame. The second data frame is different from the first data frame.

In some embodiments, the method comprises forming the first zone to further comprise a second indicator addressing scheduled UL resources for use in the second zone by that UE having a UE identity, e.g. a dedicated UE identity, to which the second indicator is addressed. Prior to forming the first data frame, the method may comprise determining whether available UL resources (e.g. unused UL resources) exist, and in response to determining that available UL resources exist the method may further comprise forming the first zone such that the available UL resources are addressed as the scheduled UL resources for use in the second zone by that UE having said UE identity.

According to still another aspect, there is provided a user equipment (UE). A transceiver is configured to receive a first data frame comprising multiple zones. A first zone of the multiple zones comprises an UE group identity which is common to several UEs in a group of UEs. Furthermore, the first zone also comprises a first indicator addressing a reserved contention-based access channel for use in a second zone by those UEs having said UE group identity. A processor and a memory are also provided. The memory comprises instructions executable by the processor, whereby the UE is operative to retrieve the UE group identity from the first zone and to utilize, by means of the transceiver, the addressed reserved contention-based access channel when the retrieved UE group identity matches that of the UE.

The second zone may be subsequent to the first zone within the first data frame. Alternatively, a second data frame comprises the second zone.

The first zone may further comprise a second indicator addressing scheduled UL resources for use in the second zone by that UE having the UE identity (e.g. a dedicated UE identity) to which the second indicator is addressed. The memory may comprise instructions executable by the processor whereby the UE is operative to apply the addressed scheduled UL resources in response to that the retrieved UE identity matches that of the UE.

According to still another aspect, there is provided a radio access network node, such as an eNB. The radio access network node comprises a processor and a memory. The memory comprises instructions executable by the processor whereby the radio access network node is operative to form a first data frame to comprise multiple zones, wherein a first zone comprises a UE group identity which is common to several UEs in a group of UEs and wherein the first zone further comprises a first indicator addressing a reserved contention-based access channel for use in a second zone by those UEs having said UE group identity. Moreover, a transceiver is configured to signal the first data frame to at least one UE.

The memory may comprise instructions executable by the processor whereby the radio access network node is operative to form the second zone to be subsequent to the first zone within the first data frame. Alternatively, the memory may comprise instructions executable by the processor whereby the radio access network node is operative to incorporate the second zone in a second data frame.

In some embodiments, the memory comprises instructions executable by the processor whereby the radio access network node is operative to form the first zone to further comprise a second indicator addressing scheduled UL resources for use in the second zone by that UE having an UE identity to which the second indicator is addressed.

Furthermore, the memory may comprise instructions executable by the processor whereby the radio access network node is operative to determine whether available UL resources exist and, in response to determining that available UL resources exist, to form the first zone such that the available UL resources are addressed as the scheduled UL resources for use in the second zone by that UE having the UE identity to which the second indicator is addressed.

According to yet another aspect, there is provided a system comprising a radio access network node and at least one UE according to the aspects described previously hereinabove.

The various embodiments described herein allow for alternative and more efficient utilizations of a contention based access channel. As is appreciated, it is proposed to introduce a UE group identity, which is common to several UEs in a group of UEs. This group ID may be signaled, e.g. broadcasted, in a first zone of a first data frame to one or several UEs. If the corresponding UE group identity of the UE in question matches the signaled UE group identity, the UE in question is allowed to subsequently utilize a reserved contention-based access channel for use in a second zone. This second zone may either be subsequent to the first zone within the first data frame or, alternatively, the second zone may be incorporated into a second data frame. It is made possible to more efficiently make use of the a contention based access channel, since the second zone that could otherwise have been unused in the existing art, is indeed utilized to the extent possible or appropriate.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter with reference to the accompanying drawings, in which certain embodiments are shown. The technology may, however, be embodied in many different forms and should not be construed as limited to the embodiments set forth herein: rather, these embodiments are provided by way of example so that this disclosure will be thorough and complete, and will fully convey the scope of the technology to those persons skilled in the art. Like reference numbers refer to like elements or method steps throughout the description.

Figure 1:
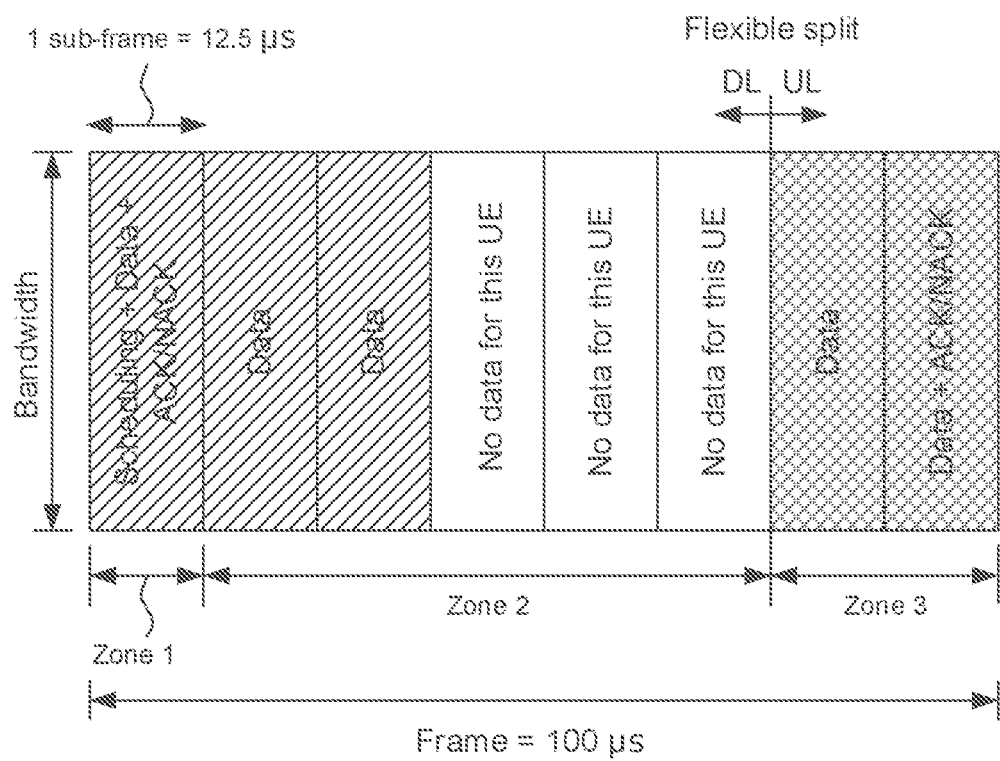
FIG. 1 shows a flexible TTI data frame structure.
Figure 2:
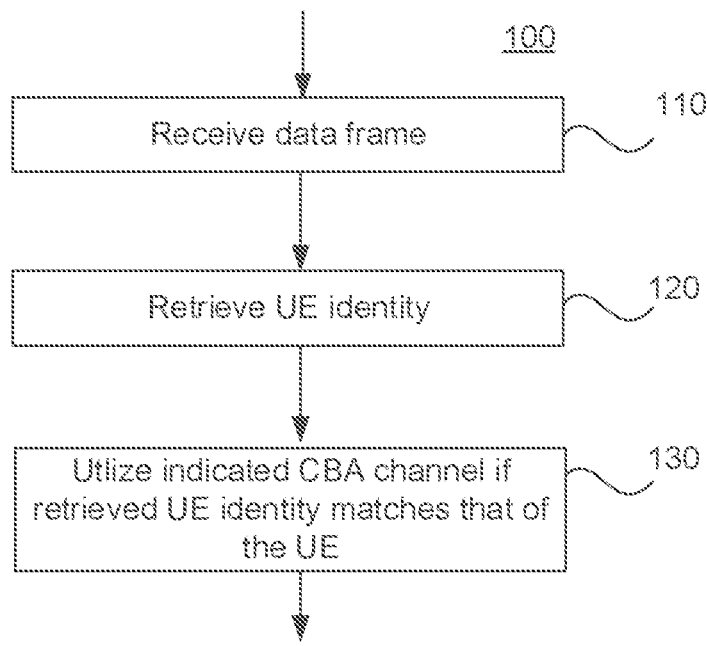
FIG. 2 is a flowchart illustrating an embodiment of method steps executable by a communication device such as a UE.
Figure 3:
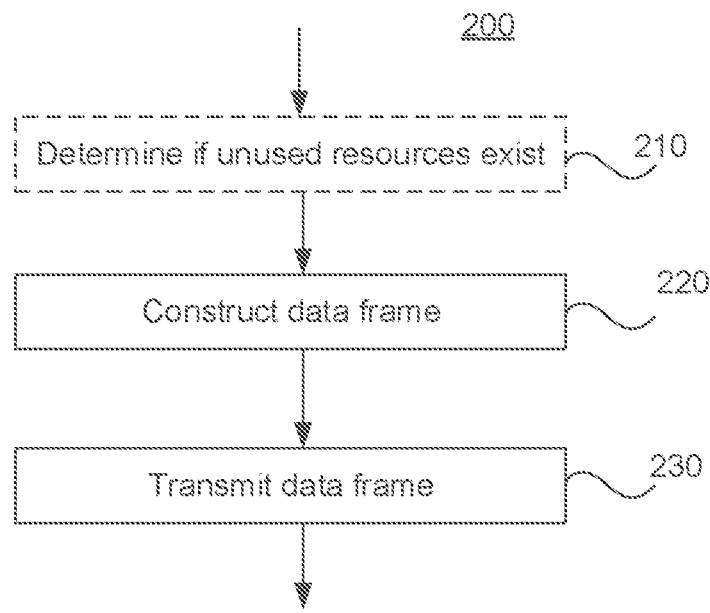
FIG. 3 is a flowchart illustrating an embodiment of method steps executable by a radio access network node.

In one of its aspects, this disclosure relates to improved utilization of a contention based access channel. With reference to FIGS. 2 and 3 as well as FIGS. 6-11, embodiments of methods executable by a UE and a radio access network node, respectively, will be described. As will be appreciated, FIGS. 6-11 represent different embodiments of a flexible TTI data frame 600, 700 as described with reference to FIG. 1. The flexible TTI data frame 600, 700 has three zones, zone 1 denoted 602, 701, zone 2 denoted 601, 702 and zone 3 denoted 603, 703.

Turning now to FIG. 2, a flowchart illustrating an embodiment of a method executable by a UE will be described in more detail. A first data frame 600 which comprises multiple zones 601, 602, 603 is received 110 e.g. from a radio access network node, such as an eNB. The first zone 601 typically comprises an UE group identity. This UE group identity is common to several UEs in a group of UEs. Furthermore, the first zone 601 comprises a first indicator addressing a reserved contention-based access channel for use in a second zone 603, 703 by those UEs having said UE group identity. Moreover, the UE group identity is retrieved 120, or otherwise read, from the first zone 601. The retrieved UE group identity is compared with that of the UE and if, or when, it is determined that the retrieved UE group identity matches that of the UE the UE utilizes 130 the addressed reserved contention-based access channel.

In some embodiments, the first zone may further comprise a second indicator addressing scheduled UL resources for use in the second zone by that UE having an UE identity to which the second indicator is addressed (i.e. having a matching UE identity). This UE identity may be a dedicated UE identity, and thus not a UE group identity. The method may thus also comprise applying the addressed scheduled UL resources in response to that a retrieved UE identity matches that of the UE.

An UE thus reads the control signaling in zone 1 denoted 601 of a data frame 600, 700 (see FIGS. 1 and 6-11) and by that knows among other things its receive DL assignments and resources it may use for UL transmissions. Assignments (or a field derived from the assignment, e.g. a cyclic redundancy check) targeting a group of UEs are typically encoded and/or scrambled with the UE group identity when the control message is intended for a group of UEs. Such a scheme is e.g. already used in LTE. This disclosure proposes to introduce a UE group identity, which could also be referred to as Contention Based Group ID, which is used for a control message defining the contention based access channel in zone 3 of a data frame, see FIGS. 6-11. All UEs (or, alternatively, UEs configured to do so) search for a control message addressed to the UE group identity—at least if these UEs would like to transmit in the UL—and if the UEs find such a control message these UEs will determine the contention based access channel. The UE may then use the contention based access channel to transmit in the UL. Even if a UE has UL resources scheduled, it may make sense to search for a control message addressed to UE group identity since a UE may in this way increase its UL resources if needed.

In some embodiments, which are illustrated in FIGS. 6, 8, 9, 10 and 11, the second zone denoted 603 is subsequent to the first zone 601 within the first data frame 601. Depending on UE capabilities, it may not be possible to decode a control message addressed to UE group identity in zone 1 denoted 601 and start utilizing the contention based access channel in zone 3 denoted 603. In such embodiments, the second zone 703 may instead be comprised in a second data frame 700. In other words, the control message does not define the contention based access channel in the current first data frame 600 but in a subsequent second data frame 700 allocated a defined number of frames in the future, see FIG. 7.

With reference to FIG. 3, a flowchart illustrating an embodiment of a corresponding method executable by a radio network node, such as an eNB. A first data frame 600 is formed 220. The first data frame comprises multiple zones 601, 602, 603, wherein a first zone 601 comprises the earlier-mentioned UE group identity which is common to several UEs in a group of UEs. Furthermore, the first zone 601 is formed to include a first indicator addressing a reserved contention-based access channel for use in a second zone 603, 703 by those UEs having said UE group identity. Moreover, the method comprises signaling 230, e.g. broadcasting, the first data frame 600 to one or several UEs.

In some embodiments, such as those illustrated in FIGS. 6, 7, 9, 10 and 11, the second zone 603 is formed 220 to be subsequent to the first zone within the first data frame 600. In alternative embodiments, the second zone is instead incorporated 220 in a second data frame 700.

Optionally, prior to forming 220 the first data frame it may be determined 210 whether available UL resources, such as unused UL, resources, exist. In response to determining that available UL resources exist, the first zone may be formed 220 such that the available UL resources are addressed as the scheduled UL resources for use in the second zone 603, 703 by a UE having a UE identity to which a second indicator is addressed.

With reference to FIGS. 8, 9, 10 and 11, various embodiments of the data frame 600 will be detailed. The contention based access channel may have different time-frequency resource shapes in zone 3 denoted 603. In the embodiment shown in FIG. 8, the complete zone 3 is defined for contention based access, in this case no scheduled transmissions are allocated in zone 3. That is, the complete zone is used for contention based access.

Figure 9:
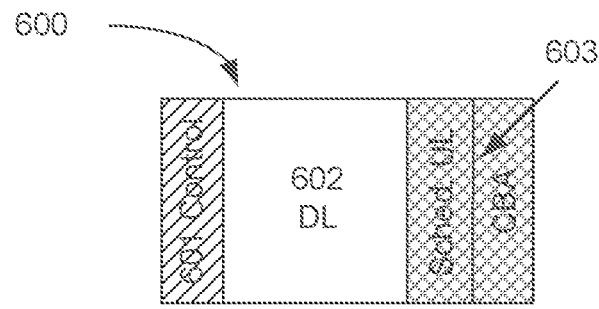
Figure 10:
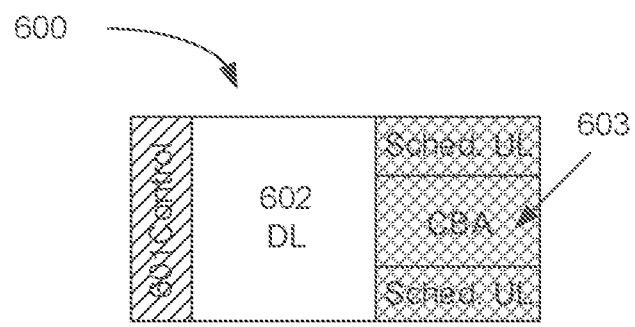

The contention based access channel illustrated in FIGS. 9 and 10 enables a finer tuning of the contention based access channel, in FIG. 9 the last portion of a data frame 600 is reserved for contention based access. This is an illustration only. Similar examples fitting into the same embodiment would e.g. be if the first portion of zone 3 would be reserved for contention based access or maybe even the middle part. In FIG. 10, a fraction of the bandwidth is reserved for contention based access. Common to both FIGS. 9 and 10 is that only one dimension (either time or frequency) needs to be signaled while in the other dimension the contention based access channel expands over the complete zone 603. To encode the time-frequency location of the contention based access channel a signaling scheme similar to that in LTE UL to signal contiguous resources may be used. Here the starting point (FIG. 9: starting time, FIG. 10: starting frequency) and length (FIG. 9: time duration. FIG. 10: bandwidth) may be encoded into a single value.

Figure 11:
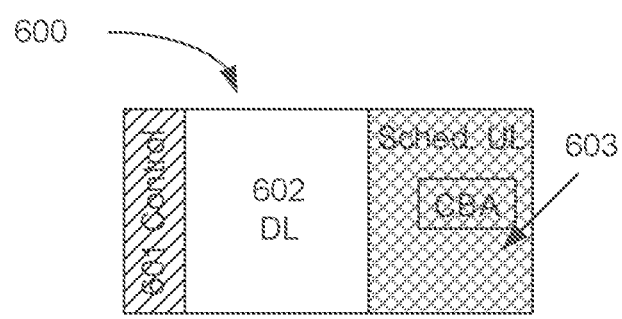

In FIG. 11 a contention based access channel is shown which is even more flexible with respect to its time-frequency resources. In this example, the contention based access channel is defined as a dedicated there rectangular region) portion of zone 3 denoted 603, Encoding of the time-frequency resources of this contention based access channel typically requires encoding of both time and frequency. One possibility would be to encode time and frequency resources separately with an encoding scheme similar to that one used in LTE UL for contiguous resources. Also schemes jointly encoding time and frequency may be envisioned. An example of such encoding of the contention based resources is to specify a multiple of rectangles in time and frequency by giving the start frequency, start time, bandwidth, and/or duration for each dedicated resource portion.

Figure 12:
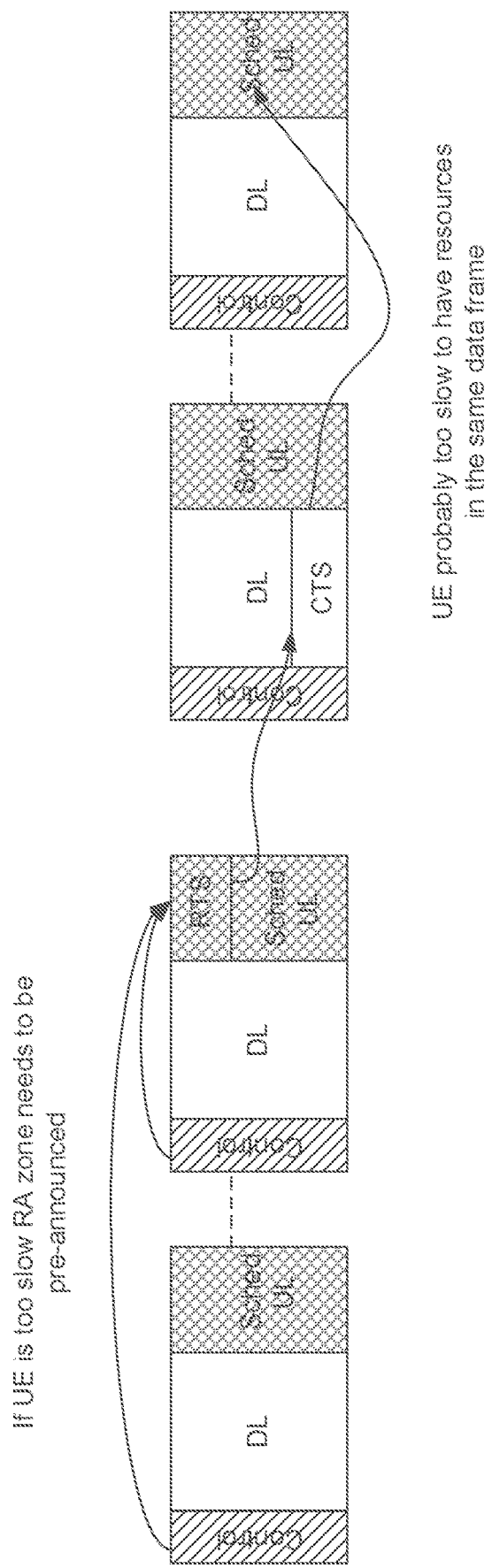
FIG. 12 illustrates a possible sequence of transmission of Contention Based Access.

Depending on the amount of resources available in the contention based access channel a UE may use this channel either to transmit just a request for resources (similar to scheduling request or random access, potentially also buffer status reporting, i.e. information about the buffer sizes) or use the resources to actually transmit the message. Which scheme to use may be determined by at least one of the following: the standard, by configuration, by size of the contention based region, by size of the UL message to transmit. FIG. 12 illustrates a conceivable sequence of transmissions in case that the UE uses the contention based resources just for requesting resources. It should be appreciated that this sequence of transmissions is similar to the LTE RA procedure.

In the first transmission the radio access network node (e.g. eNB) announces the contention based access channel as described herein. The UE then uses the contention based access channel to transmit a scheduling request—sometimes also called a Request to Send (RTS)—or maybe a buffer status report. In the example shown in FIG. 12 the UE is assumed to be too slow to use UL resources in the same data frame, therefore the DL control channel points to a subsequent frame (which are defined a certain number of frames later in time) which comprises the contention based access channel. The transmission of the UL also comprises a UE identity that the eNB may use subsequently to communicate with the UE. If the radio network node successfully receives the RTS signal together with the UE identity, the radio access network node may grant the UE resources using resources in zone 1 and/or zone 2. This signaling may also sometimes be referred to as Clear to Send (CTS). Depending on the UE speed the granted resources may be in the same data frame or in a subsequent data frame. In the shown example the granted resources are in a subsequent frame (again, defined a certain number of frames later in time). After having received the CTS signaling the UE may use the granted resources for transmission. The standard procedure of accessing the contention based ASUs (Atomic Scheduling Units) is for a node to choose one or multiple ASUs by random and use them for transmission.

Access conflicts may be handled by collision detection, i.e., simply noting that there has been a collision and that one or several messages may have been lost. A radio access network node that notices that there has been a collision announces this, e.g., by setting a "collision has occurred in previous contention based period"-bit in the next control signaling message (in zone 1) that may comprise the contention based period announcement. The radio access network node may also be more detailed and specify in which atomic scheduling unit that the collision occurred. This allows the nodes that have accessed the specified ASUs to take action if there has not been any acknowledgement of safe reception, such as a subsequent CTS message. This may occur, e.g., if a sera message was captured despite the collision. The radio network access node may reply with a clear to send (CTS) message, thus clearly indicating that the message has been received at the radio access network node. Alternatively a radio access network node does nothing upon a collision and after a specified time duration has expired a node that has used contention based resources without receiving a CTS may perform a retry. Nodes that are informed of the detected collision and whose messages have been lost may try again in parts of the contention based resources in a subsequent frame. The nodes may adjust the way they choose the contention based ASUs to access. An example is to instead of transmitting a whole IP message using several adjacent ASUs to to use a single ASU to request scheduled resources. Alternatively, it may adopt some version of back-off system: if collision, those nodes with odd MAC addresses/UE identity may use the first half of the contention based resources (sorted as indicated above) and nodes with even MAC addresses/UE identity uses the other half of the resources.

Even though the embodiments that are outlined hereinabove are mainly in the context of a radio access network node granting contention based UL resources to a UE it may be generalized to the scenario where one radio access network node grants contention based resources for transmission to another node. Typically the other node will use the contention based resources to transmit to the granting radio access network node. However, it could be even envisioned that the granting radio access network node grants contention based access resources to a second node which uses these resources to transmit to a third node. An example of this usage is when the contention based resources are used to set up device-to-device communication coordinated by the radio access network node. Furthermore, the variants of contention based access channels illustrated in FIGS. 8, 9, 10 and 11 are all limited to one data frame. However, it could be envisioned to extend the contention based access channel to multiple frames, in this case the signaling identifying the time-frequency resources of the contention based access channel would identify time-frequency resources in multiple zones 3 in multiple frames. In this disclosure, mainly the time-frequency resource aspect of contention based channel has been described. This may easily be generalized to other parameters, e.g. reference signal (structure), on what resources an acknowledgment will be received from the receiving node, allowed maximum transmit power, etc: in principal all parameters defining the contention based access channel.

Figure 4:
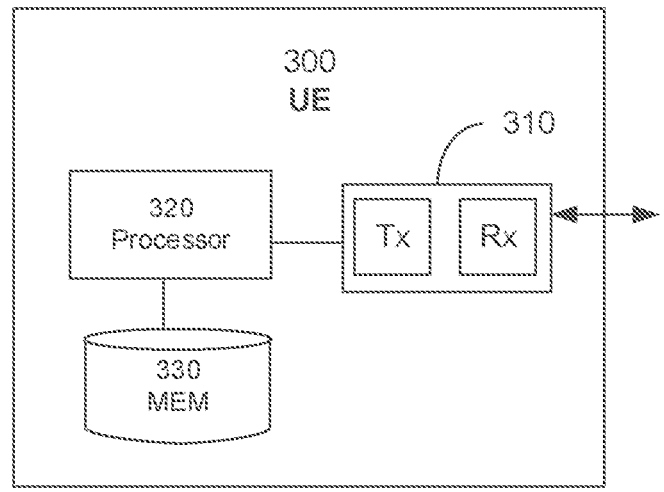
FIG. 4 illustrates an example embodiment of a communication device such as a UE.

Turning now to FIG. 4, an embodiment of a UE 300 will be described. The UE 300 is configured to perform, or otherwise execute, the method described with respect to FIG. 2. In one example embodiment, the UE 300 comprises means 310 adapted to receive a first data frame comprising multiple zones. The first zone comprises an UE group identity which is common to several UEs in a group of UEs. Also, the first zone further comprises a first indicator addressing a reserved contention-based access channel for use in a second zone by those UEs having said UE group. The means 310 may be implemented as a receiver (Rx). Alternatively, the means 310 may be implemented as a transceiver (Tx/RX) having both transmitter (Tx) and receiver (Rx) functionality. Furthermore, the UE 300 comprises means 320, 330 adapted to retrieve the UE group identity from the first zone. Moreover, means 310 adapted to utilize the addressed reserved contention-based access channel when the retrieved UE group identity matches that of the UE is provided. The means 310 adapted to utilize the addressed reserved contention-based access channel when the retrieved UE group identity matches that of the UE may be implemented as transmitter (Tx). Alternatively, the means 310 may be implemented as a transceiver (Tx/RX) having both transmitter (Tx) and receiver (Rx) functionality. The above-mentioned means 320, 330 may be implemented by a processor 320 and a memory 330. For example, the memory 330 may comprise instructions executable by the processor 320, whereby the UE 300 is operative to retrieve the UE group identity from the first zone and to utilize, by means of the transceiver 310, the addressed reserved contention-based access channel when the retrieved UE group identity matches that of the UE.

The first zone may additionally comprise a second indicator addressing scheduled UL resources for use in the second zone by that UE having a UE group identity to which the second indicator is addressed. The UE 300 may then also comprise means 320, 330 adapted to apply the addressed scheduled UL resources in response to that the retrieved UE identity matches that of the UE. For example, in one example implementation, the memory 330 comprises instructions executable by the processor 320 whereby the UE 300 is operative to apply the addressed scheduled UL resources in response to that the retrieved UE identity matches that of the UE.

As mentioned earlier, the second zone may be subsequent to the first zone within the first data frame. Alternatively, a second data frame comprises the second zone.

Figure 5:
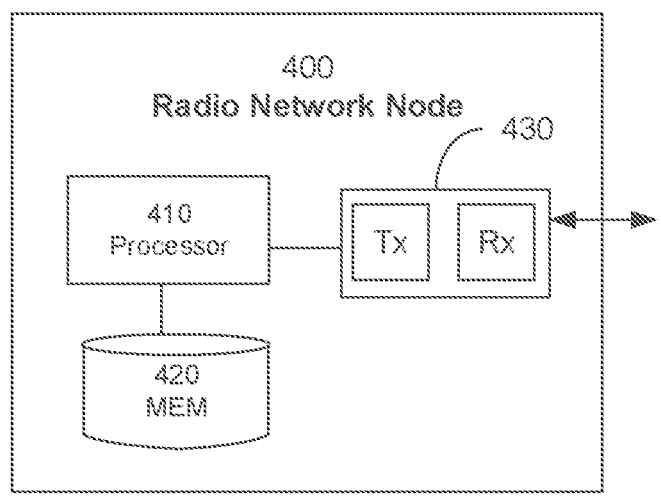
FIG. 5 illustrates an example embodiment of a radio access network node such as an eNB.
Figure 6:
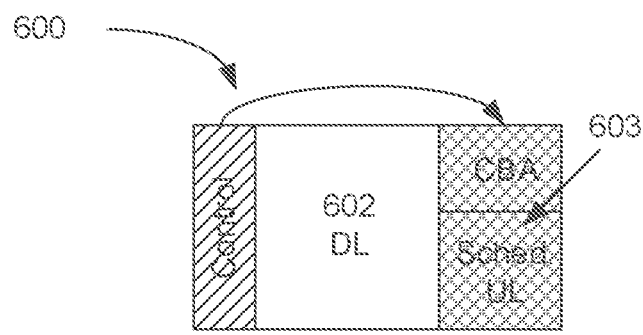
FIGS. 6-11 illustrate various embodiments of a flexible TTI data frame structure.
Figure 7:
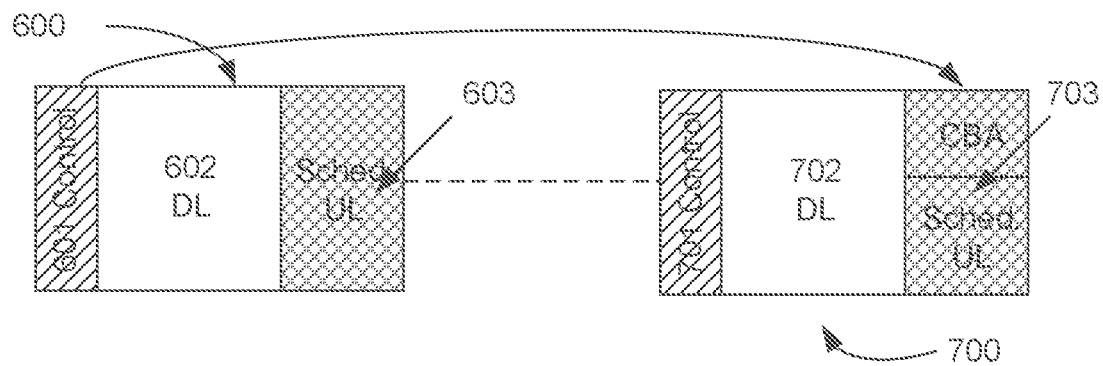
Figure 8:
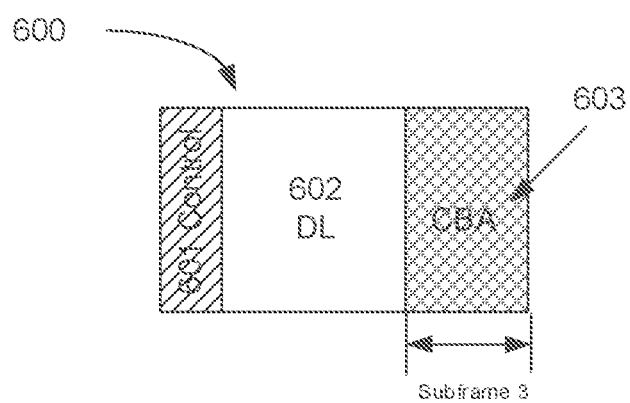

With reference to FIG. 5, an embodiment of a radio access network node 400 will be described. The radio access network node may be an eNB. The radio access network node 400 is configured to perform, or otherwise execute, methods described with respect to FIG. 3. In one example embodiment, the radio access network node 400 comprises means 410, 420 adapted to form a first data frame to comprise multiple zones, wherein a first zone is formed to comprise a UE group identity which is common to several UEs in a group of UEs and wherein the first zone is further formed to comprise a first indicator addressing a reserved contention-based access channel for use in a second zone by those UEs having said UE group identity. In one example implementation, the means 410, 420 are implemented by a processor 410 and a memory 420. For example, the memory 420 may comprise instructions executable by the processor 410, whereby the radio access network node 400 is operative to form a first data frame to comprise multiple zones, wherein a first zone comprises the UE group identity which is common to several UEs in a group of UEs and wherein the first zone further comprises the first indicator addressing the reserved contend on-based access channel for use in the second zone by those UEs having said UE group identity. Also, means 430 adapted to signal (e.g. transmit or broadcast) the first data frame to at least one UE is provided. The means 430 may be implemented as a transmitter (Tx). Alternatively, the means 430 may be implemented as a transceiver (Tx/Rx) 430 having both transmission and reception functionality.

The radio access network node 400 may comprise means 410, 420 adapted to form the second zone to be subsequent to the first zone within the first data frame. For example, the memory 420 may comprise instructions executable by the processor 410 whereby the radio access network node 400 is operative to form the second zone to be subsequent to the first zone within the first data frame.

Additionally, or alternatively, the radio access network node 400 may comprise means 410, 420 adapted to incorporate the second zone in a second data frame. For example, the memory 420 may comprise instructions executable by the processor 410 whereby the radio access network node 400 is operative to incorporate the second zone in a second data frame.

Furthermore, the radio access network node 400 may comprise means 410, 420 adapted to form the first zone to further comprise a second indicator addressing scheduled UL resources for use in the second zone by a UE having a UE Identity to which the second indicator is addressed. For example, the memory 420 may comprise instructions executable by the processor 410 whereby the radio access network node 400 is operative to form the first zone to further comprise the second indicator addressing scheduled UL resources for use in the second zone by a UE having a UE identity to which the second indicator is addressed. Still further, the radio access network node 400 may comprise means 410, 420 adapted to determine whether available UL, resources exist and, in response to determining that available UL resources exist, to form the first zone such that the available UL resources are addressed as the scheduled uplink, UL, resources for use in the second zone by that UE having a UE identity to which the second indicator is addressed. In one example implementation, the memory 420 comprises instructions executable by the processor 440 whereby the radio access network node 400 is operative to determine whether available UL resources exist and, in response to determining that available UL resources exist, to form the first zone such that the available UL resources are addressed as the scheduled UL resources for use in the second zone by that UE having a UE identity to which the second indicator is addressed.

The various embodiments described herein allow for alternative and more efficient utilizations of a contention based access channel. As is appreciated, it is proposed to introduce a UE group identity, which is common to several UEs in a group of UEs. This group ID may be signaled e.g. broadcasted, in a first zone 601 of a first data frame 600 to one or several UEs. If the corresponding UE group identity of the UE in question matches the signaled UE group identity, the UE in question is allowed to subsequently utilize a reserved contention-based access channel for use in a second zone 603, 703. This second zone may either be subsequent to the first zone within the first data frame or, alternatively, the second zone may be incorporated into a second data frame. It is made possible to more efficiently make use of the a contention based access channel, since the second zone that could otherwise have been unused in the existing art, is indeed utilized to the extent possible or appropriate. This may allow for faster setup of a contention based access channel. In turn, this may enable contention based usage of resources which would have been otherwise unused. The overall radio communication network efficiency may therefore be enhanced.

In the detailed description hereinabove, for purposes of explanation and not limitation, specific details are set: forth such as particular architectures, interfaces, techniques, etc. in order to provide a thorough understanding of various embodiments, in some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted thus in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

What is claimed is:

1. A method performed by a User Equipment (UE) operating in a wireless communication network, the method comprising:
    receiving control signaling from a radio access network node, the control signaling conveyed in a first portion of a data frame and indicating a contention-based access channel (CBAC) defined within a later occurring portion of the data frame or within a subsequently occurring data frame, and further indicating a contention-based group identity (CBID) that identifies a group of UEs permitted to use the CBAC for uplink transmissions; and
    performing an uplink transmission on the CBAC in dependence on whether the UE has uplink data to send and belongs to the group of UEs identified by the CBID.

2. The method of claim 1, wherein the control signaling further individually identifies one or more UEs and corresponding scheduled uplink resources within the later occurring portion of the data frame, and wherein the method further comprises, responsive to having uplink data to send and determining that the UE is one of the individually-identified UEs, performing an uplink transmission on the corresponding scheduled uplink resources.

3. The method of claim 2, wherein, when the UE is one of the individually-identified UEs, the UE determines whether the UE has uplink data to send on the CBAC in consideration of the amount of uplink data available for transmission from the UE and the amount of uplink data accommodated by the corresponding scheduled uplink resources.

4. The method of claim 1, wherein performing the uplink transmission on the CBAC in dependence on whether the UE has uplink data to send and belongs to the group of UEs identified by the CBID comprises sending the uplink data via the CBAC or sending a request via the CBAC, requesting uplink resources for use in transmitting the uplink data.

5. A User Equipment (UE) configured for operation in a wireless communication network, the UE comprising:
    communication circuitry configured for wireless communication with a radio access network node in the wireless communication network; and
    processing circuitry operatively associated with the communication circuitry and configured to:
        receive control signaling from the radio access network node, the control signaling conveyed in a first portion of a data frame and indicating a contention-based access channel (CBAC) defined within a later occurring portion of the data frame or within a subsequently occurring data frame, and further indicating a contention-based group identity (CBID) that identifies a group of UEs permitted to use the CBAC for uplink transmissions; and
        perform an uplink transmission on the CBAC in dependence on whether the UE has uplink data to send and belongs to the group of UEs identified by the CBID.

6. The UE of claim 5, wherein the control signaling further individually identifies one or more UEs and corresponding scheduled uplink resources within the later occurring portion of the data frame, and wherein, responsive to the UE having uplink data to send and determining that the UE is one of the individually-identified UEs, the processing circuitry is configured to perform an uplink transmission on the corresponding scheduled uplink resources.

7. The UE of claim 6, wherein, when the UE is one of the individually-identified UEs, the processing circuitry is configured to determine whether the UE has uplink data to send on the CBAC in consideration of the amount of uplink data available for transmission from the UE and the amount of uplink data accommodated by the corresponding scheduled uplink resources.

8. The UE of claim 5, wherein, for performing the uplink transmission on the CBAC in dependence on whether the UE has uplink data to send and belongs to the group of UEs identified by the CBID, the processing circuitry is configured to send the uplink data via the CBAC or send a request via the CBAC, requesting uplink resources for use in transmitting the uplink data.

9. A method performed by a radio access network node in a wireless communication network, the method comprising:
    transmitting control signaling in a first portion of a data frame, the control signaling indicating a contention-based access channel (CBAC) defined within a later occurring portion of the data frame or within a subsequently occurring data frame, and further indicating a contention-based group identity (CBID) that identifies a group of UEs permitted to use the CBAC for uplink transmissions; and
    receiving a contention-based uplink transmission on the CBAC, as transmitted from one of the UEs belonging to the group of UEs identified by the CBID.

10. The method of claim 9, further comprising sizing the CBAC in dependence on the amount of scheduled uplink resources reserved by the radio access network node within the later occurring portion of the data frame or within the subsequently occurring data frame.

11. A radio access network node configured for operation in a wireless communication network, the radio access node comprising:
    communication circuitry configured for transmitting to and receiving from User Equipments (UEs); and
    processing circuitry operatively associated with the communication circuitry and configured to:

transmit control signaling in a first portion of a data frame, the control signaling indicating a contention-based access channel (CBAC) defined within a later occurring portion of the data frame or within a subsequently occurring data frame, and further indicating a contention-based group identity (CBID) that identifies a group of UEs permitted to use the CBAC for uplink transmissions; and receive a contention-based uplink transmission on the CBAC, as transmitted from one of the UEs belonging to the group of UEs identified by the CBID.

12. The radio access network node of claim 11, wherein the processing circuitry is configured to size the CBAC in dependence on the amount of scheduled uplink resources reserved by the radio access network node within the later occurring portion of the data frame or within the subsequently occurring data frame.

* * * * *